United States Patent [19]

Flygstad

[11] 4,139,743
[45] Feb. 13, 1979

[54] HEADSET
[75] Inventor: Dean W. Flygstad, St. Paul, Minn.
[73] Assignee: Telex Communications, Inc., Minneapolis, Minn.
[21] Appl. No.: 816,321
[22] Filed: Jul. 18, 1977
[51] Int. Cl.² ............................................. H04M 1/05
[52] U.S. Cl. .................................. 179/156 A; 179/178
[58] Field of Search ............................ 179/156 A, 178
[56] References Cited
FOREIGN PATENT DOCUMENTS
1177925  1/1970  United Kingdom ............... 179/156 A Primary Examiner—William C. Cooper
Attorney, Agent, or Firm—Warren A. Sturm; Hugh D. Jaeger

[57] ABSTRACT

A headset having an ear cup with a beveled spherical socket hole which rotatably supports and seats a spherical boom support swivel. The swivel consists of two half ball elements held in registration on an asymmetrical boom through gripping action of an asymmetrical hole in each of the half ball elements. Opposing ramp projections and sockets in the half ball elements bias the half ball elements in opposing rotational motion about the boom axis when the half balls are urged toward each other by a floating spring retainer plate thus producing a torque on the boom which is tightly gripped by the opposing half ball elements. Opposing outward projections on the boom mate with depressions in the half ball elements to prevent longitudinal sliding of the boom opposite the swivel and adjacent the operator's mouth. The swivel is rotatably held in the beveled spherical socket hole by the floating spring retainer plate having a flanged dish forming a ball seat swivel. Screws fastening the floating spring retainer plate to the ear cup adjust the degree of force on the swivel against the socket hole. A stop in the ear cup acting in conjunction with stops on the half ball elements limit travel of the boom to less than 360°. An outward circular projection on each element of the swivel provides additional support for the swivel to prevent gouging of the ear cup by the boom.

19 Claims, 8 Drawing Figures

U.S. Patent   Feb. 13, 1979   4,139,743
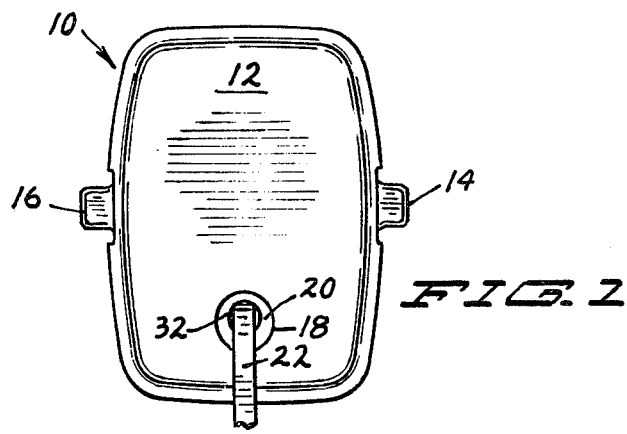
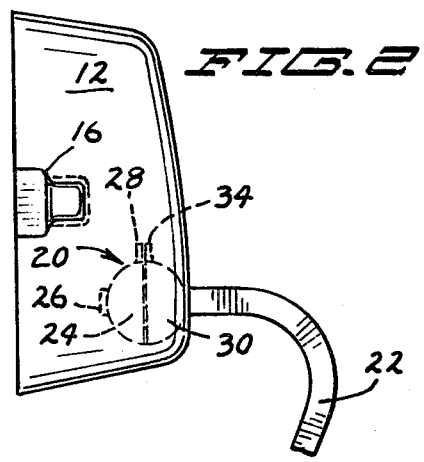
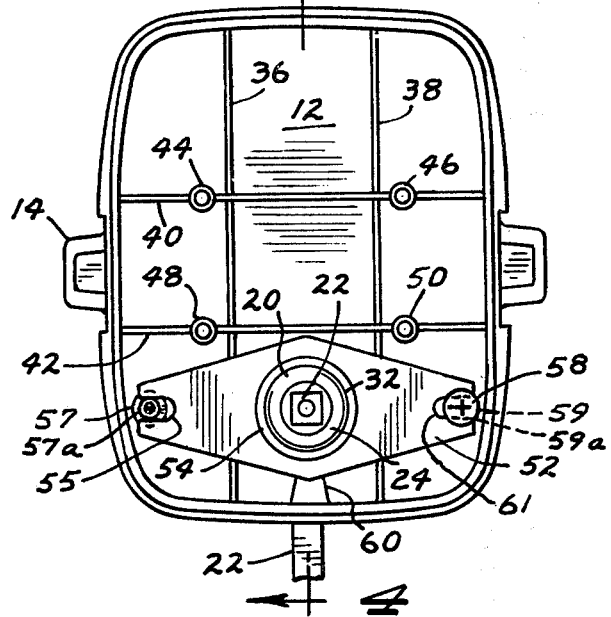
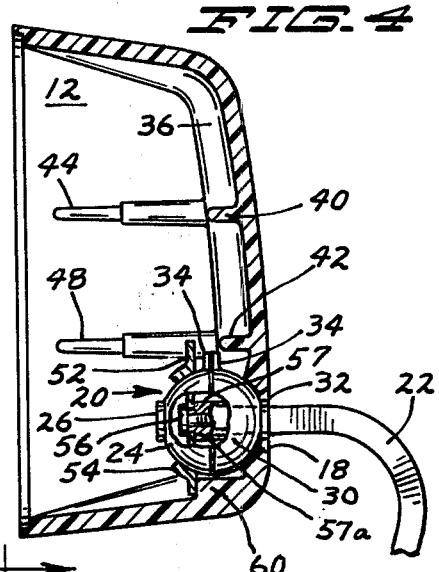
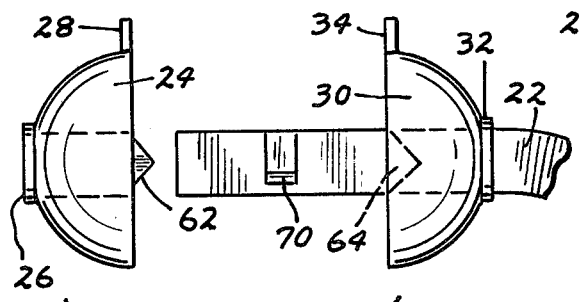
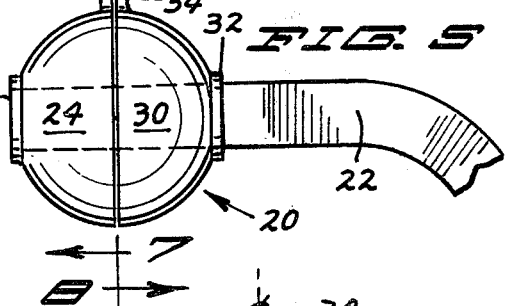
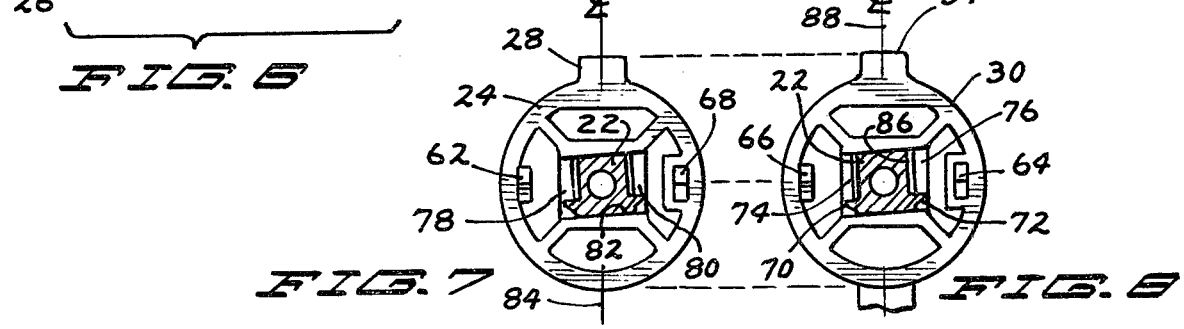

HEADSET

BACKGROUND OF THE INVENTION

1. Field of the Invention

The present invention relates generally to improvements in a headset, and more particularly, pertains to a new and improved spherical boom support swivel to provide a torque on a pair of half ball element support members to securely grip the boom and that is held in a beveled spherical socket hole of an ear cup of the headset by a predetermined force.

2. Description of the Prior Art

Those concerned with the development of headsets have long recognized the need for an easily rotatable and adjustable boom for use on the right or left side of an operator's head. The present invention fills this need in the art.

Prior art headsets in the past utilized a microphone boom which was fixedly secured or limitly adjustable in the ear cup of the headset. Such booms in the prior art have been unsatisfactory in that the boom could not be easily adjusted adjacent to the corner of the operator's mouth. Also, the prior art booms failed to utilize a swivel having free circular movement. Most movement of the prior art booms was extremely limited due to the structural mounting of the boom in the ear cup. In some prior art headsets, the boom was permanently affixed to the ear cup preventing any movement whatsoever so that an operator could not twist the boom and loosen any connecting wires between the microphone supported on the boom and the headset. Further, other headsets were intended for use by either a right handed operator or a left handed operator, but not for use by both. Finally, in adjustable prior art headsets, the headsets utilized extremely complex internal mechanical structure to grip the boom and secure the boom in the ear cup. When the boom was rotatably adjustable, the complexity of the structure was further compounded by complex internal ball and socket structure to provide rotation for the boom. These prior art devices were less than satisfactory.

Prior art headset patents disclosing representative prior art booms are disclosed in patents issued to Williams, U.S. Pat. No. 1,979,183; Sidders, U.S. Pat. No. 2,020,084; Gilbert, U.S. Pat. No. 2,586,644; Bryant et al., U.S. Pat. No. 3,440,365; Hutchings, U.S. Pat. No. 3,610,841; Bonis et al., U.S. Pat. No. 3,735,021; Gurman, U.S. Pat. No. 3,796,841; and Foley, U.S. Pat. No. 3,971,901.

This invention obviates the foregoing disadvantages of the prior art by providing a headset having a rotatable adjustable spherical boom support swivel, having torque producing structure, which securely grips the boom supporting a microphone and structure which maintains the boom in a predetermined position.

SUMMARY OF THE INVENTION

The present invention obviates the foregoing disadvantages of the prior art by providing a headset with a novel spherical boom support swivel which permits complete adjustment of the boom with respect to an operator's mouth from either the right or left side of an operator's head.

According to the preferred embodiment of the present invention, there is provided a headset having an ear cup with a beveled spherical socket hole in a portion of the ear cup, a spherical boom support swivel consisting of two half ball elements biased into registration and rotated with respect to each other on a boom by a floating spring retainer plate whereby the retainer plate produces a predetermined force on the spherical boom support swivel to maintain the boom in a predetermined fixed position supporting a microphone adjacent the corner of an operator's mouth.

A significant aspect and feature of the present invention is an easily rotatable and adjustable spherical boom support swivel which grips the boom having a microphone at the other end adjacent an operator's mouth.

Another significant aspect and feature of the present invention is a floating spring retainer plate internal to the ear cup of the headset performing a two-fold function. First, the spring retainer plate produces a predetermined force on the spherical boom support swivel and the boom attached thereto supporting the microphone. Second, the floating spring retainer plate biases the two half ball elements together which form the spherical boom support swivel to provide a torque between them so as to securely grip the boom.

A further significant aspect and feature is a boom which rotates around the ear cup in less than a 360° orbital path to prevent internal twisting of wires connecting the microphone supported by the boom to the headset.

Having briefly described the embodiment of the present invention and significant aspects and features, it is a principal object thereof to provide a new and improved headset.

An object of the present invention is to provide a headset with an adjustable boom having limited circular movement. The boom supports a microphone at one end adjacent an operator's mouth and is gripped by the spherical boom support swivel at the other end.

Another object of the invention is an ear cup of the headset which permits the boom to rotate for use on either the right or left side of an operator.

A further object of the invention is a stop integral to the ear cup of the headset to limit rotation of the boom to less than 360° so that it is impossible for an operator to twist the boom around in a complete circle to loosen or disconnect wiring internal to and between the ear cup and the microphone.

Still another object is to provide a predetermined force on the boom to always maintain the boom in a fixed position adjacent to an operator's mouth.

Still an additional object is to provide a torque producing structure in the swivel to securely grip the boom and alleviate any slack between the swivel and the boom.

BRIEF DESCRIPTION OF THE DRAWING

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 illustrates a front view of a preferred embodiment of a headset, the invention;

FIG. 2 illustrates a left side view of the headset as shown in FIG. 1;

FIG. 3 illustrates a rear view of the headset as shown in FIG. 1;

FIG. 4 illustrates a section of the headset taken on the line 4—4 of FIG. 3 looking in the direction of the arrows and illustrates a cutaway side view of a spherical boom support swivel showing floating spring retainer plate structure;

FIG. 5 illustrates an enlarged side view of the spherical boom support swivel and boom of the heatset;

FIG. 6 illustrates an exploded view of half ball elements of the spherical boom support swivel and the boom of the headset of FIG. 5;

FIG. 7 illustrates a section of one-half of the spherical boom support swivel of the headset taken on line 7—7 of FIG. 5, and;

FIG. 8 illustrates a section of the other half of the spherical boom support of the headset 10 taken on the line 8—8 of FIG. 5.

DESCRIPTION OF THE PREFERRED EMBODIMENTS

FIG. 1, which illustrates a front view of the preferred embodiment of the headset 10, the invention, shows an ear cup 12, with a right and left headband spring retainer 14 and 16 respectively affixed to the midsection of each side of the ear cup 12. A beveled spherical socket hole 18 in a lower portion of the ear cup 12 rotatably supports and seats a spherical boom support swivel 20 which grips an asymmetrical boom 22 shown in the drawing as a square tubular boom for purposes of illustration and way of example only. A microphone, not shown, is attached to the other end of the boom 22 to be positioned adjacent to an operator's mouth.

FIG. 2 illustrates a left side view of the headset 10 as shown in FIG. 1 showing the ear cup 12, the left headband spring retainer 16, the spherical boom support swivel 20, and the boom 22. The spherical boom support swivel 20 consists of a left half ball element 24 having an outward circular projection 26 and a left boom stop 28, and a right half element 30 having an outward circular projection 32 shown in FIG. 1 and a right boom stop 34. The two half ball elements 24 and 30 when joined together form the spherical boom swivel 20.

FIG. 3 illustrates a rear view of the headset showing the ear cup 12, the right and left head band spring retainers 14 and 16 respectively, the boom 22 in the spherical boom support swivel 20, the outward circular projection 32 of the right half ball element 30 and a portion of the boom 22 below the ear cup 12. Vertical members 36 and 38 and horizontal members 40 and 42 provide structural support for the ear cup 12. Support pegs 44–50 provide spaced support for a driver element and associated electrical circuitry in the ear cup 12. A floating spring retainer plate 52 having a semi-spherical flanged dish 54 forming a ball seat mates with and produces a predetermined force on the spherical boom support swivel 20, and is secured to the ear cup 12 with a screw 56 shown in FIG. 4 into a support 57 having a shoulder 57a and with a screw 58 into a support 59 having a shoulder 59a. Slots 55 and 61 permit the floating spring retainer plate 52 to ride and float between the shoulders 57a and 59a when held in place by screws 56 and 58 and the supports 57 and 59. A stop 60 positioned inside the ear cup 12 below the swivel hole 18 restricts the circular travel of right and left boom stops 28 and 34 respectively of the spherical boom support swivel 20 to less than 360°.

FIG. 4 illustrates a section of the headset taken on the line 4—4 of FIG. 3 looking in the direction of the arrows showing the ear cup 12, the vertical member 36, the horizontal member 40 and 42 respectively, the support pegs 44 and 48, and the stop 60. FIG. 4 also shows the spherical boom support swivel 20 consisting of the left half ball element 24, the outward circular projection 26, the left boom stop 28, the right half ball element 30, the outward circular projection 32, and the right boom stop 34. The spherical boom support swivel 20 grips the boom 22 and is retained within the ear cup 12 by the floating spring retainer plate 52. FIG. 4 further shows a cutaway side view of the swivel 20 showing the screw 56, the support 57, the shoulder 57a and the plate 52 floating in between respectively.

FIG. 5 illustrates an enlarged side view of the spherical boom support swivel 20 and the square tubular boom 22 of the headset 10 with all reference numbers corresponding accordingly to those previously described.

FIG. 6 illustrates an exploded view of the left and right half ball elements 24 and 30 respectively and the boom 22 of the headset 10 of FIG. 5. A ramp projection 62 extends outwardly from the left half ball element 24 to fit into and register with a corresponding and opposing socket 64 in the right half ball element 30 shown in FIG. 8. A ramp projection 66 shown in FIG. 8 extends outwardly from the right half ball element 30 to fit into and register with a corresponding and opposing socket 64 in the right half ball element 30 shown in FIG. 8. A ramp projection 66 shown in FIG. 8 extends outwardly from the right half ball element 30 to fit into and register with a corresponding and opposing socket 68 shown in FIG. 7 in the left half ball element 24. The left half ball element 24 registers with the right half ball element 30 to form the spherical boom support swivel 20. Opposing outward projections 70 and 72 shown in FIG. 8 on each side of the boom 22 protrude and extend outwardly perpendicular from the boom 22 to fit into depressions 74 and 76 of the right half ball element 30 and into recesses 78 and 80 of the left half ball element 24. When the two half ball elements 24 and 30 register together to form the spherical boom support swivel 20, the outward opposing projections 70 and 72 of the boom 22 fit into the depressions 74–80 of the two half ball elements 24 and 30.

FIG. 7 illustrates a section of the spherical boom support swivel 20 of the headset 10 taken on the line 7—7 of FIG. 5 showing a canted square hole 82 at an angle of two degrees forty-five minutes, by way of example and for purposes of illustration only with respect to the center line 88 while any other suitable angle of cantation may be used in lieu thereof. The socket 64 and the depressions 74 and 76 extend inwardly of the right half ball element 30. The square tubular boom 22 with retainer outward projections 70 and 72 is shown canted in the square hole 86 with respect to the center line 88.

PREFERRED MODE OF OPERATION

Referring to the figures of the drawing, the headset 10 is assembled by bending the boom 22 to a desired curvature such that the microphone attached to the end of the boom 22 is generally positioned at the corner of the operator's mouth when gripped by the spherical boom support swivel 20 and rotatably held in the ear cup 12. When the boom 22 is shaped, the right half ball element 30 is slid onto the boom. Then, the outward projections 70 and 72 are formed from the material of the square tubular boom 22 by any suitable method known in the art such as scarfing following which the left half ball element 24 is slid onto the boom.

When the left and right half ball elements 24 and 30 come into opposing registration and the ramp projections 62 and 66 of elements 24 and 30 register and biasely mate with the corresponding and opposing sockets 64 and 68 of elements 24 and 30 respectively, an opposing rotational motion of the left hand ball element 24 with respect to the right half ball element 30 about the axis of the boom 22 occurs due to the cantation of square holes 82 and 86 of elements 24 and 30 respectively to produce a torque action on the assymetrical boom 22, thereby securely gripping the boom and alleviating any slack between the boom 22 and the swivel 20. The ramps 62 and 66 and sockets 64 and 68 further prevent twisting of the elements 24 and 30. The elements 24 and 30 when biased together mate in registration to form the spherical boom support swivel 20.

The elements 24 and 30 forming the spherical boom support swivel 22 are biased together to mate and are held in registration by the action of the floating spring retainer plate 52 against the interior circumference of the beveled or spherical socket hole 18. The spring retainer plate 52 is held onto the ear cup 12 by the screws 56 and 58 to produce a predetermined force on the spherical boom support swivel 22 and to maintain the swivel 20 in a stationary position adjacent the operator's mouth. The spring ball seat of the swivel 22 against the socket 18 and the flanged dish 54 of the plate 52 simultaneously provides a bias to frictionally restrain motion of the boom assembly in any desired adjusted position.

The internal hollow cavities of the half ball elements may be filled with sound attenuation compound or any equivalent thereof to seal the boom 22 to the outer right ball half element 30 for sound attenuation. The outer right ball half element 30 in seating against the spherical or beveled socket hole 18 further seals the ear cup 12 to attenuate noise from the outside environment.

The outward circular projection 26 tangentially mates and rides in the semi-spherical flanged dish 54 of the plate 52 and the outward circular projection 32 tangentially mates and rides in the beveled socket hole 18. The outward circular projections 26 and 32 provide limited support in addition to providing limited restrained movement of the swivel 20 and further prevents the boom 22 from gouging the beveled spherical socket hole 18.

The circular travel of the boom 22 is restricted to less than 360° through the boom stops 28 and 36 affixed to the elements 24 and 30 which are not permitted to rotate past the stop 60 in the ear cup 12. This prevents the boom 22 from traveling in a circular path and loosening any wires running from the ear cup 12 to the microphone at the adjacent end of the boom 22. The boom stops 28 and 36 may be positioned at any desired location on the half ball elements 24 and 30 to limit rotational travel of the swivel 20.

Various modifications can be made to the headset of the present invention without departing from the apparent scope thereof. The canted square holes 82 and 86 of elements 24 and 30 may be any suitable degree of cant from the center line, but a preferable range is from one to four degrees. The stop 60 in the ear cup 12 may be any suitable width to restrict the circular travel of the swivel to less than 360°, preferably around 270° of circular travel. The holes 82 and 86 in the half ball elements 24 and 30 are of such a shape to accomodate the asymmetrical boom 22 and a square shape has been utilized for way of example and purposes of illustration only.

Having thus described the invention, what is claimed is:

1. A headset to be worn on the head of an operator comprising:
   a. an ear cup housing a receiver and having seat means surrounding an aperture in said ear cup;
   b. boom support means having complimentary configuration with respect to said seat means to provide triaxial rotation in said seat means and being rotatably disposed against said seat means internal of said ear cup, and comprised of two semispherical members each having an aperture for receiving a boom and means for providing rotational movement therebetween to lockably engage a boom when a longitudinal biasing force is applied to bias said boom support means against said seat means;
   c. means providing a longitudinal biasing force against said boom support means thereby biasing said boom support means against said seat means; and,
   d. a boom having one end extending through and carried by said boom support means and a microphone supported at the other end.

2. A headset of claim 1 further comprising:
   a. projection means on said boom, and;
   b. a recess in said boom support means to accommodate said projection means on said boom whereby said boom is locked into engagement with said boom support means preventing movement of said boom in said boom support means.

3. A headset of claim 1 further comprising:
   a. stop means on said boom support means, and;
   b. a stop positioned internally in a portion of said ear cup whereby said stop when engaged against said stop means on said boom support means restrains rotation of said boom support means to less than 360°.

4. A headset of claim 1 further comprising:
   a. shoulder means to adjustably float said biasing means against said boom support means whereby the degree of predetermined force of said biasing means against said boom support means is adjustable by said shoulder means.

5. A headset of claim 1 further comprising:
   a. a portion of a sphere in said biasing means to seat said boom support means.

6. A headset of claim 5 further comprising opposing circular projection means extending from said boom support means to ride within said seat means and a portion of a sphere in said biasing means whereby said circular projection means limits rotational motion of said boom support means and prevents said boom from gouging said ear cup.

7. A headset of claim 1 further comprising torque producing means between said boom support means whereby said torque producing means provides relative rotation of one boom support member with respect to the other boom support member.

8. A headset of claim 1 further comprising opposing apertures in said boom support means whereby said boom is gripped by said opposing apertures.

9. A headset of claim 1 further comprising means to attenuate noise in the interior of said ear cup.

10. A headset of claim 9 wherein said attenuation means comprises a sound attenuation compound filling said boom support means whereby said compound acoustically seals said boom to said boom support means.

11. A headset of claim 1 wherein said boom support means comprises:
   a. said two semispherical members;
   b. an opposing hole in each of said members to accommodate said boom, and;
   c. said means for providing rotational movement comprising a ramp projection and an opposing socket for each of said members whereby said ramp projection on each of said members registers with said opposing and corresponding socket of each of said members when said members are in registration thereby providing torque around said boom.

12. A headset of claim 11 wherein said hole in each of said members is a noncircular hole whereby said opposing holes grip said boom when said members are biased into registration thereby rotating slightly with respect to each other.

13. A headset of claim 11 further comprising:
   a. a recess in each of said members, and;
   b. projection means comprising outward opposing projections on said boom whereby said recesses in said registered members accommodate said outward projections of said boom to prevent movement of said boom in said boom support means.

14. A headset of claim 11 further comprising:
   a. a stop projection on each of said members;
   b. a stop internal to said ear cup whereby said stop projections align when said members are registered and limit rotation of said boom support means to less than 360° when said stop projections engage with said stop.

15. A headset of claim 11 further comprising:
   a. a circular projection on each of said members to ride within said seat of said ear cup and within a portion of a sphere in said biasing means whereby said circular projections limit outward travel of said boom support means.

16. A headset of claim 1 wherein said seat means comprises a section of a sphere.

17. A headset of claim 1 wherein said two semispherical members comprise a sphere.

18. In a headset, a boom supporting ear cup comprising:
   a. an ear cup with an interior seat surrounding an aperture in a portion of said ear cup;
   b. boom support means positioned on said interior seat internal of said ear cup and comprising at least a pair of boom support members, each having an axially aligned boom supporting aperture and including torque producing means therebetween;
   c. an elongated boom having a cross-sectional shape complimentary to the apertures in said boom support members extending through said boom support means; and,
   d. means biasing said boom support means against said seat whereby said torque producing means provides relative rotation of one boom support member with respect to other boom support member and said boom support means retains said boom in a predetermined position with respect to said ear cup while permitting triaxial motion of said boom.

19. The apparatus of claim 18 in which the apertures in said boom support members are noncircular.

* * * * *